Aug. 12, 1958  J. L. EVANS ET AL  2,847,323
COATED METAL ARTICLES
Filed Dec. 1, 1955
BAKED PRIMER,LAYER OF PIGMENTED ESTER
OF EPOXYHYDROXY POLYETHER RESIN AND
DRYING-TYPE FATTY OIL ACID.   TOP LAYER OF
METHYL METHACRYLATE LACQUER
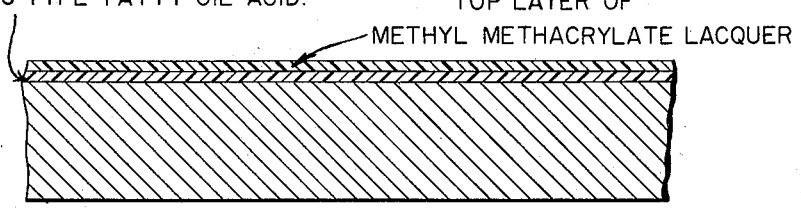
INVENTORS
JOHN LLOYD EVANS &
JOSEPH ANTHONY PAPPALARDO
BY
ATTORNEY United States Patent Office 2,847,323
Patented Aug. 12, 1958

2,847,323

COATED METAL ARTICLES

John Lloyd Evans, Springfield, Pa., and Joseph Anthony Pappalardo, Dayton, Ohio, assignors to E. I. du Pont de Nemours and Company, Wilmington, Del., a corporation of Delaware Application December 1, 1955, Serial No. 558,140

8 Claims. (Cl. 117—73)

This invention relates to multiple-layer finishing systems for metal, and more particularly to such systems comprising a pigmented fatty acid-esterified epoxyhydroxy polyether resin type of primer and a pigmented methyl methacrylate lacquer top layer directly over the primer.

The term "epoxyhydroxy polyether resin" and related terms, as used herein, mean polymeric compositions prepared by condensing a polyhydric phenol with an epihalohydrin or a polyepoxy compound. An example is a polyether resin containing epoxy and hydroxy groups prepared by condensing diphenylol propane and epichlorohydrin. In such a resin the residues of these reactants are believed to occur in substantially alternating linear arrangement and to be joined by ether oxygen atoms.

The term "polymer of methyl methacrylate" and related terms, as used herein, mean homopolymers of methyl methacrylate, copolymers and methyl methacrylate and other materials copolymerizable therewith containing a major proportion of methyl methacrylate, or mixtures of such homopolymers and/or copolymers.

The terms "methyl methacrylate lacquer," "methyl methacrylate coating composition," and related terms, as used herein, for the sake of brevity, mean liquid coating compositions containing conventional pigments and solvents and, as the principal film-forming material, a polymer of methyl methacrylate. The methyl methacrylate lacquers may also contain conventional modifiers, such as plasticizers, inhibitors, dispersing agents, flow control agents and the like. When reference is made to a layer or film of methyl methacrylate lacquer, the term signifies a dry layer obtained by applying one or more coatings of such liquid compositions to a suitable substrate and permitting or causing the coating to dry.

The term "primer," as used herein, means a liquid coating composition which is applied to the metal article being coated, or a dry layer thereof derived from one or more applications of the liquid composition.

The terms "topcoat" and "top layer," as used herein, mean the last liquid coating composition which is applied to the metal article being coated, or a dry layer thereof derived from one or more applications of the liquid composition.

The term "finishing system," as used herein, means a multiple-layer coating of at least two different coating compositions comprising a primer and a top layer in adherent contact therewith.

It is known that polymers of methyl methacrylate have excellent outdoor durability. In particular, pigmented lacquers containing methyl methacrylate polymers as the principal film-forming material have excellent gloss retention, i. e., the original high gloss is retained during long periods of outdoor exposure. However, such compositions do not inherently possess the high level of metal-protecting and rust-inhibiting properties required for painting metal which is to be used outdoors, e. g., steel automobile bodies. Therefore, in order to take advantage of the excellent durability of methyl methacrylate lacquers, the metal to be finished must first be primed with a metal-protecting and rust-inhibiting primer. One or more coats of methyl methacrylate lacquer are applied thereover to provide a durable decorative top layer.

It has been found that the conventional metal primers, which are commonly used under alkyd resin enamel, aminoaldehyde resin enamel or nitrocellulose lacquer topcoats, are not suitable for use under methyl methacrylate lacquer topcoats. More specifically, the durability advantages of methyl methacrylate lacquer top layers cannot be fully realized with these primers because of metal-to-primer or primer-to-top layer relations which cause a failure in the finishing system before the top layer alone has failed to the same stage of non-serviceability. In particular, finishing systems comprising a methyl methacrylate lacquer top layer over a conventional prior art metal primer are characterized by one or more of the following important deficiencies: Poor adhesion of the primer to metal, poor adhesion of the topcoat to the primer, and cracking of (development of fissures in) the top layer and/or the multiple-layer finishing system.

The broad object of this invention is to provide an improved multiple-layer metal finishing system comprising a primer and a top layer.

A specific object of this invention is to provide a multiple-layer metal finishing system comprising a top layer of a methyl methacrylate lacquer and, directly thereunder, a layer of a metal protective primer, the characteristics of the primer, the metal-to-primer relationships, and the primer-to-top layer relationships being such that full advantage can be taken of the excellent outdoor durability of methyl methacrylate lacquers.

A more specific object of this invention is to provide a multiple-layer metal finishing system comprising a top layer of a methyl methacrylate lacquer and, directly thereunder, a layer of a metal protective primer which differs from prior art primers in that it possesses simultaneously the essential properties of excellent adhesion to metal, excellent adhesion of the top layer to it without the need for sandpapering the dry primer, and resistance to cracking of the top layer and/or the multiple-layer finishing system.

A further object is to provide metal particles, particularly steel articles, having a hard, adherent, durable and crack-resistant multiple-layer protective coating comprising a methyl methacrylate top layer.

These objects are accomplished by providing a multiple-layer finishing system for metal comprising a layer of primer and a superposed layer of methyl methacrylate lacquer in adherent contact therewith, said primer being a baked layer of a liquid coating composition comprising pigment, solvent, and, as the principal film-forming material, epoxyhydroxy polyether resin esterified with 10–50%, by weight based on said resin, of drying-type fatty oil acid.

The coated articles of this invention are prepared, in a preferred embodiment, by applying directly to the metal article a liquid primer having the above defined composition, baking it to produce a hard adherent layer, applying directly thereover a liquid methyl methacrylate lacquer, and drying the latter.

The critical characteristics of the primer apparently reside in the organic film-forming material. Epoxyhydroxy polyether resins esterified with less than 10% of their own weight of fatty oil acid do not provide the hard crack-resistant primers required in this invention. Also they cost more to use than such resins esterified with higher proportions of fatty oil acid, partly because the resins cost more than the acids, and more expensive solvents are required to prepare suitable solutions. Epoxyhydroxy polyether resins esterified with more than 50% of their own weight of fatty oil acid do not provide primers to which methyl methacrylate lacquers adhere well as required in this invention.

The following specific examples are provided by way of illustration but not of limitation. Unless otherwise indicated, the parts and percentages are by weight.

EXAMPLE 1

*Preparation of esterified epoxyhydroxy polyether resin A*

Resin A was prepared by placing 900 parts by weight of "Epon" 1004, 300 parts of distilled soya fatty acids, and 400 parts of aromatic hydrocarbon solvent (boiling range 150–185° C.) in a reaction vessel equipped with a thermometer, agitator and reflux condenser having a water trap. "Epon" 1004 is an epoxyhydroxy polyether resin having a melting point of 95–105° C. and an epoxide equivalent of 870–1025. It is described by the supplier as fundamentally a polymeric condensation product of bis-phenol, i. e. diphenylol propane, and epichlorohydrin.

The charge was heated with the water trap drain cock open, to about 240° C. in about 55 minutes. The drain cock was then closed and the charge was refluxed at 240–250° C. for about 5 minutes, at which time the esterification reaction was considered complete, as evidenced by an acid number of less than 2 on the solid esterified resin. Heating was discontinued, and the charge was cooled to room temperature. Solvent was then added to replace the solvent previously distilled off.

In this preparation 33.3% of fatty oil acid was used, based on the weight of the epoxyhydroxy polyether resin used.

*Preparation of liquid primer composition*

A liquid primer of this invention was prepared by mixing the following ingredients and grinding them in conventional paint grinding apparatus until a smooth dispersion was produced:

| | Parts by weight |
|---|---|
| Fatty acid esterified resin A | 1735 |
| Whiting (calcium carbonate) | 1280 |
| Carbon black | 115 |
| Aromatic hydrocarbon solvent (boiling range 150–185° C.) | 1640 |
| Isophorone | 230 |
| | 5000 |

EXAMPLE 2

A second liquid primer of this invention was prepared as in Example 1, except that "Araldite" 6075 epoxyhydroxy polyether resin was substituted for "Epon" 1004, on an equal weight basis, in making the fatty acid esterified epoxyhydroxy polyether resin B.

"Araldite" 6075 is an epoxyhydroxy polyether resin having a melting point of 80–92° C., and an epoxide equivalent of .130–.160 per 100 grams.

EXAMPLE 3

*Preparation of esterified epoxyhydroxy polyether resin C*

Resin C was prepared substantially as in Example 1 by refluxing the following charge at 200–240° C. for about 15 minutes:

| | Parts by weight |
|---|---|
| "Epon" 1007 | 294 |
| Dehydrated castor oil fatty acids | 36 |
| Cyclohexanone | 112 |
| Aromatic hydrocarbon solvent (boiling range 150–185° C.) | 210 |
| | 652 |

"Epon" 1007 is an epoxyhydroxy polyether resin having a melting point of 127–133° C. and an epoxide equivalent of 1550–2000.

In this preparation about 12% of fatty oil acid was used, based on the weight of the epoxyhydroxy polyether resin used.

*Preparation of liquid primer composition*

The following ingredients were ground until a smooth dispersion was produced:

| | Parts by weight |
|---|---|
| Fatty acid esterified resin C | 651 |
| Whiting | 320 |
| Carbon black | 29 |
| | 1000 |

Eight parts of manganese naphthenate drier solution containing 3% manganese were admixed with this composition.

EXAMPLE 4

*Preparation of esterified epoxyhydroxy polyether resin D*

Resin D was prepared substantially as in Example 1 by refluxing the following charge at 200–240° C. for about 15 minutes:

| | Parts by weight |
|---|---|
| "Epon" 1009 | 360 |
| Dehydrated castor oil fatty acids | 40 |
| Cyclohexanone | 200 |
| Xylene | 200 |
| | 800 |

"Epon" 1009 is an epoxyhydroxy polyether resin having a melting point of 145–155° C. and an epoxide equivalent of 2400–4000.

In this preparation about 11% of fatty oil acid was used, based on the weight of the epoxyhydroxy polyether resin used.

*Preparation of liquid primer composition*

The following ingredients were ground until a smooth dispersion was produced:

| | Parts by weight |
|---|---|
| Fatty acid esterified resin D | 651 |
| Whiting | 320 |
| Carbon black | 29 |
| | 1000 |

Ten parts of manganese naphthenate drier solution containing 3% manganese were admixed with this composition.

EXAMPLE 5

*Preparation of esterified epoxyhydroxy polyether resin E*

Resin E was prepared substantially as in Example 1 by refluxing the following ingredients at about 250° C. for about one hour:

| | Parts by weight |
|---|---|
| "Epon" 1001 | 325 |
| "Acintol" D | 175 |
| Aromatic hydrocarbon solvent (boiling range 150–185° C.) | 356 |
| | 856 |

"Epon" 1001 is an epoxyhydroxy polyether resin having a melting point of 64–76° C. and an epoxide equivalent of 450–525.

"Acintol" D is distilled tall oil containing 66.6% fatty oil acid, 32% rosin acids and 1.4% unsaponifiables. The fatty oil acid component contains about 46% lineoleic acid, 51% oleic acid, and 3% saturated fatty oil acids.

In this preparation, about 36% of fatty oil acid was used, based on the weight of the epoxyhydroxy polyether resin used.

Preparation of liquid primer composition

The following ingredients were ground until a smooth dispersion was produced:

| | Parts by weight |
|---|---|
| Fatty acid esterified resin E | 246 |
| Whiting | 181 |
| Carbon black | 16 |
| Aromatic hydrocarbon solvent (boiling range 150–185° C.) | 157 |
| | 600 |

Three parts of iron naphthenate drier solution containing 6% iron were admixed with this composition.

PRIOR ART COMPOSITIONS I–V

To compare primers (Examples 1–5) having the improved properties claimed in this invention with prior art primers, the five following commercially available, commonly used, and widely accepted prior art primers for steel products, such as automobile bodies, fenders and hoods, were prepared by pigmenting different combinations of organic film-forming materials with conventional primer pigments of the type used in the foregoing examples. Their organic film-forming constituents, on a non-volatile solids basis, were as follows:

Composition I: Parts by weight
| | |
|---|---|
| 55% linseed oil modified glycerol phthalate resin | 59.3 |
| 50% linseed oil modified phenol formaldehyde resin varnish | 40.7 |
| | 100.0 |

Composition II:
| | |
|---|---|
| 52% soya oil modified glycerol phthalate resin | 100.0 |

Composition III:
| | |
|---|---|
| 65% linseed oil modified ester gum varnish | 92.8 |
| Bodied linseed oil | 7.2 |
| | 100.0 |

Composition IV:
| | |
|---|---|
| 43% soya oil modified glycreol phthalate resin | 11.2 |
| 35% soya oil modified glycerol phthalate resin | 68.4 |
| Butylated urea-formaldehyde resin | 20.4 |
| | 100.0 |

Composition V:
| | |
|---|---|
| 43% soya oil modified glycerol phthalate resin | 100.00 |

The primers described in Examples 1–5 and prior art compositions I–V were thinned to a suitable spraying viscosity and each composition was applied to duplicate 4" x 12" autobody steel panels, which had previously been treated with a "Bonderite" rust inhibitor, in sufficient amount to produce a smooth uniform dry coating about 1 mil thick. Due to their different drying characteristics, the wet coated panels were baked at different temperatures for different lengths of time as follows, to produce the proper degree of cure or hardness:

| Primer: | Baking conditions ° F. |
|---|---|
| Example 1 | 20 minutes at 400 |
| Example 2 | 20 minutes at 400 |
| Example 3 | 20 minutes at 400 |
| Example 4 | 20 minutes at 300 |
| Example 5 | 20 minutes at 400 |
| Composition I | 60 minutes at 200 |
| Composition II | 15 minutes at 400 |
| Composition III | 25 minutes at 370 |
| Composition IV | 45 minutes at 275 |
| Composition V | 30 minutes at 180 |

The primed panels were cooled to room temperature and subsequently sprayed with a top layer of the methyl methacrylate lacquer set forth in column 6, which is typical of satisfactory methyl methacrylate lacquers. This had been thinned to a suitable spraying viscosity, in sufficient amount to yield a smooth, uniform, dry coating about 2 mils thick. The wet topcoated panels were baked for 20 minutes at 180° F. to speed up the drying and produce dry, hard coatings. This would have required 16–24 hours at room temperature. The methyl methacrylate lacquer had the following composition:

| | Parts by weight |
|---|---|
| Homopolymer of methyl methacrylate | 29.74 |
| Dibutyl phthalate | 11.93 |
| Titanium dioxide | 7.16 |
| Carbon black | 0.07 |
| Ferrite yellow | 0.98 |
| Red iron oxide | 0.12 |
| Toluol | 25.00 |
| Xylol | 25.00 |
| | 100.00 |

The homopolymer of methyl methacrylate employed in this composition had a relative viscosity of about 1.142. This value is the value of the fraction $$\frac{(A)}{(B)} \frac{\text{efflux time of polymer solution}}{\text{efflux time of solvent used in polymer solution}}$$

The efflux times were measured in accordance with the procedure of A.S.T.M. D-445–46T Method B, using as the "oil" mentioned in said procedure, (A) a solution of 0.25 gram of the methyl methacrylate polymer in 50 cc. of ethylene dichloride, and (B) a sample of the ethylene dichloride used in making said solution, respectively. The determinations were run at 25° C. in a modified Ostwald viscosimeter, series 50.

The methyl methacrylate lacquer was prepared by grinding the pigment in the presence of the polymer until a smooth uniform dispersion was obtained.

The thus coated panels had acceptable properties with respect to appearance, gloss and hardness; and no differences were readily apparent between those coated with a prior art primer and those having a finishing system of this invention.

One set of panels was tested for the critical properties of adhesion of the primer to the panel and adhesion of the top layer to the primer by cutting two 2" marks in the form of an X vertically through the coating down to the metal, securely pressing a strip of pressure-sensitive cellophane adhesive tape over the X, and pulling it off with a jerk, whereby varying amounts of the finishing systems were removed. In this test, all of the primers adhered well to the panel and the methyl methacrylate lacquer topcoat adhered well to the primers of Examples 1–5 but was easily stripped from the prior art primers A–E.

The other set of these panels was tested for the critical property of resistance to cracking by exposing them outdoors in Florida for 8 months. The panels primed with the products of Examples 1–5 were all free of cracks in the coating after this period of weathering.

The above results show that the finishing systems of this invention are resistant to cracking during outdoor service and are markedly superior to analogous finishing systems using prior art primers in adhesion of the methyl methacrylate lacquer to the primer.

The particular epoxyhydroxy polyether resins employed in the examples and the fatty oil acids with which they were esterified are merely illustrative of a wide variety of such resins and acids which may be used in the primers of this invention.

The epoxyhydroxy polyether resins may be purchased on the open market under such trade names as "Epon" and "Araldite," or they may be prepared by condensing a polyhydric phenol with an epihalohydrin or a polyepoxy compound in accordance with well known methods, such as those discussed in U. S. Patents 2,503,726; 2,582,985; 2,592,560 and 2,694,694.

Suitable polyhydric phenols are, for example, resorcinol, hydroquinone, catechol, diphenylol propane, p,p'-dihydroxydiphenyl, and similar polyhdric anthracenes and naphthalenes. Diphenylol propane is a preferred polyhydric phenol.

Suitable epoxyhydroxy contribution compounds for condensation with the polyhydric phenols are, for example, epichlorohydrin, epibromohydrin, epihalohydrins of mannitol, sorbitol and erythritol, glycerol dichlorohydrin, butylene diepoxide, bis(2,3 epoxypropyl) ether, and diepoxides of mannitol and sorbitol. Epichlorohydrin is a preferred species.

The preferred epoxyhydroxy polyether resins contain on the average more than one epoxy group and more than one hydroxy group per molecule.

The fatty oil acids used to esterify the epoxyhydroxy polyether resins are predominantly drying type fatty oil acids, i. e., the type which occur in combined form in glyceride oils having drying properties, such as linseed, tung, soya, dehydrated castor, perilla and oiticica. Such acids contain substantial proportions of fatty oil acids containing 18–22 carbon atoms and at least two carbon-to-carbon double bonds per molecule. The most convenient form in which to use such acids is as the mixtures thereof in the proportions in which they occur in natural products, such as glyceride drying and semi-drying oils and tall oil. However, acids of a single species may be used, such as linoleic, linolenic, eleostearic and licanic. Likewise mixtures thereof may be used, as well as mixtures of one or more of these with, preferably, a minor amount of such common fatty oil acids as oleic, stearic, palmitic and the like.

The preferred fatty oil acids are the mixtures derived from glyceride oils having drying properties.

Although 10–50% of fatty oil acid, based on the weight of the epoxyhydroxy resin, produces esters which are useful in the primers of this invention, the preferred amount of fatty oil acid is 25–40%.

It will be obvious to those skilled in the art that the esterified epoxyhydroxy polyether resins employed in the illustrative examples may be replaced wholly or partly by other esterified epoxyhydroxy polyether resins, prepared from the other epoxyhydroxy polyether resins and the other fatty oil acids described immediately above, with substantially similar results.

Other pigments commonly used in liquid organic coating compositions may be substituted for all or part of the pigments used in the examples. Such other pigments include, for instance, titanium dioxide, iron blues, organic pigments, silica, china clay, talc, and metallic oxides, carbonates, silicates, chromates, sulfides and sulfates.

Examples of volatile solvents and diluents which may likewise be used in the products of this invention are, for instance, aliphatic, cycloaliphatic and aromatic hydrocarbons, esters, ethers, ketones and alcohols.

Although the preferred primers contain esterified epoxyhydroxy polyether resin as the sole organic film-forming material, minor amounts of other organic film-forming materials compatible therewith may be included, such as plasticizers, oil-modified alkyd resins, alkylated amino aldehyde resins and phenol aldehyde resins.

The primers of this invention are preferably baked at schedules varying from 2 hours at 300° F. to 10 minutes at 425° F., although it will be obvious that other baking times and temperatures may be used, providing the resulting film of primer is thoroughly dry and hard.

The methyl methacrylate lacquer employed as a top layer in the foregoing description of this invention is merely representative of a wide variety of such lacquers which may be used in the improved finishing systems of this invention. All of the constituents of said lacquer may be varied in kind and/or proportion by means well-known in the art. A suitable homopolymer of methyl methacrylate is specifically disclosed. Suitable copolymers include copolymers of methyl methacrylate with a minor proportion, e. g., 2–25%, of another material copolymerizable therewith, for instance, acrylic and methacrylic acids, the $C_1$–$C_4$ alkyl esters of acrylic acid, the $C_2$–$C_4$ alkyl esters of methacrylic acid, vinyl acetate, acrylonitrile, and styrene. A particularly useful copolymer contains about 98% of methyl methacrylate and 2% of methacrylic acid.

The preferred polymers for use in the methyl methacrylate lacquers have a relative viscosity between 1.117 and 1.196, and topcoat lacquers based on such polymers are disclosed and claimed in copending application Serial No. 434,661, filed June 4, 1954, by Laverne W. Crissey and John H. Lowell. Still other topcoat lacquers, which are particularly adapted to convenient spray application, are disclosed and claimed in copending application Serial No. 402,498, filed January 6, 1954, by Laverne W. Crissey and John H. Lowell.

The preferred finishing systems of this invention consist of the specified type of primer layer, preferably in contact with the metal substrate, and a methyl methacrylate lacquer top layer in contact with the primer. However, it will be obvious, from the fact that all of the primers described in this specification, including prior art primers adhered well to metal, that a prior art primer may be used as the first layer on the metal, followed in sequence by a layer of a primer of the type required in this invention and a top layer of a methyl methacrylate lacquer. The important requirement is that no other layer be placed between the latter two.

The finishing systems of this invention are useful for obtaining the maximum in outdoor durability from methyl methacrylate top layer lacquers on metal articles, which advantage has not been possible through the use of prior art primers. The finishing systems are particularly useful on steel automobile bodies.

It is apparent that many widely different embodiments of this invention can be made without departing from the spirit and scope thereof; and, therefore, it is not intended to be limited except as indicated in the appended claims.

We claim:

1. A metal article having a hard, adherent, crack-resistant, multiple-layer coating comprising a layer of primer and a superposed layer of methyl methacrylate lacquer in adherent contact therewith, said primer being a baked layer of a liquid coating composition comprising pigment, solvent, and, as the principal organic film-forming material, epoxyhydroxy polyether resin esterified with 10–50%, by weight based on said resin, of drying-type fatty oil acid.

2. The product of claim 1, in which the epoxyhydroxy polyether resin is esterified with 25–40%, by weight based on said resin, of drying-type fatty oil acid.

3. The product of claim 1, in which the epoxyhydroxy polyether resin is a condensation product of diphenylol propane and epichlorohydrin.

4. The product of claim 1, in which said drying-type fatty oil acid is soya oil fatty acids.

5. The product of claim 1, in which said drying-type fatty oil acid is dehydrated castor oil fatty acids.

6. The product of claim 1, in which said drying-type fatty oil acid is linseed oil fatty acids.

7. The product of claim 1, in which said drying-type fatty oil acid is the fatty oil acid mixture contained in tall oil.

8. The article of claim 1, in which the methyl methacrylate component of said methyl methacrylate lacquer, has a relative viscosity of between 1.117 and 1.196, said relative viscosity being the quotient obtained by dividing the efflux time of a solution of 0.25 gram of said methyl methacrylate component in 50 cc. of ethylene dichloride by the efflux time of ethylene dichloride, said efflux times being measured in accordance with ASTM D–445–46T Method B at 25° C. using a modified Ostwald viscosimeter, series 50.

References Cited in the file of this patent

UNITED STATES PATENTS 2,636,257 Ford _____ Apr. 28, 1953
2,705,223 Renfrew et al. _____ Mar. 29, 1955

FOREIGN PATENTS 154,146 Australia _____ Nov. 16, 1953

OTHER REFERENCES

Rubber and Plastic Age, February 1954, pages 84–87.
Paint, Oil and Chemical Review, November 9, 1950, pages 15 to 18, 48 and 49.

UNITED STATES PATENT OFFICE

CERTIFICATE OF CORRECTION

Patent No. 2,847,323            August 12, 1958

John Lloyd Evans et al.

It is hereby certified that error appears in the printed specification of the above numbered patent requiring correction and that the said Letters Patent should read as corrected below.

Column 1, line 32, for "and" read -- of --; column 2, line 46, for "particles" read -- articles --; column 5, line 43, for "glycreol" read -- glycerol --.

Signed and sealed this 28th day of October 1958.

(SEAL)

Attest:

KARL H. AXLINE
Attesting Officer

ROBERT C. WATSON
Commissioner of Patents